United States Patent

Sugizaki et al.

[11] Patent Number: 5,887,104
[45] Date of Patent: Mar. 23, 1999

[54] DISPERSION COMPENSATING OPTICAL FIBER

[75] Inventors: Ryuichi Sugizaki, Ichihara; Tamotsu Kamiya, Funabashi; Youichi Akasaka, Ichihara, all of Japan

[73] Assignee: The Furukawa Electric Co., Ltd., Tokyo, Japan

[21] Appl. No.: 917,039

[22] Filed: Aug. 13, 1997

[30] Foreign Application Priority Data

Aug. 20, 1996 [JP] Japan .................................. 8-218713

[51] Int. Cl.⁶ .................................. G02B 6/02; G02B 6/22
[52] U.S. Cl. ........................ 385/123; 385/127; 385/128
[58] Field of Search ................................ 385/123, 124, 385/127, 128; 359/161, 173

[56] References Cited

U.S. PATENT DOCUMENTS

| | | | |
|---|---|---|---|
| 5,555,340 | 9/1996 | Onishi et al. | 385/127 |
| 5,673,354 | 9/1997 | Akasaka et al. | 385/127 |
| 5,748,826 | 5/1998 | Nagano et al. | 385/127 |
| 5,802,235 | 9/1998 | Akasaka | 385/123 |

*Primary Examiner*—Hemang Sanghavi
*Attorney, Agent, or Firm*—Frishauf, Holtz, Goodman, Langer & Chick, P.C.

[57] ABSTRACT

A dispersion compensating optical fiber is connected to an optical fiber having chromatic dispersion at a transmission wavelength to cancel the chromatic dispersion out, thereby making the chromatic dispersion of an entire transmission system at the transmission wavelength substantially zero or making the chromatic dispersion close to zero. The dispersion compensating optical fiber comprises a core consisting of a quartz-based glass and a cladding formed on the surface of the core and consisting of a quartz-based glass, and a coating layer formed on the surface of the cladding and consisting of a resin, and the dispersion compensating optical fiber has an outer diameter of less than 250 μm. The coating layer has a thickness of 20 μm or more and a two-layer structure consisting of at least two layers including an inner layer and an outer layer having a Young's modulus higher than that of the inner layer.

9 Claims, 2 Drawing Sheets

into a compact small-diameter coil occupying a small space, and which can suppress an increase in polarization mode dispersion.

DISPERSION COMPENSATING OPTICAL FIBER

BACKGROUND OF THE INVENTION

The present invention relates to a dispersion compensating optical fiber which is connected to an optical fiber having positive dispersion and has negative dispersion so as to make the chromatic dispersion of the optical fiber almost zero.

An optical fiber which is generally installed as an optical communication transmission path at present is a single-mode optical fiber which exhibits zero dispersion at a wavelength of 1.3 $\mu$m. In order to increase the capacity of an optical communication network constituted by single-mode optical fibers which are generally installed, it is discussed to perform high-speed communication with light having a wavelength of 1.55 $\mu$m.

A single-mode optical fiber which has zero dispersion at a wavelength of 1.3 $\mu$m exhibits a positive dispersion with a value of about 17 ps/nm/km near a wavelength of 1.55 $\mu$m. For this reason, light having a wavelength of 1.55 $\mu$m is used, a dispersion compensating means is required.

As a practical method for dispersion compensation, a method of inserting a great negative dispersion optical fiber into an optical fiber transmission path to cancel the dispersion out. This method uses a phenomenon that a negative structure dispersion having a large absolute value can be obtained by properly selecting the refractive index distribution of an optical fiber.

One concrete dispersion compensating structure using this method is disclosed in Jpn. Pat. Appln. KOKAI Publication No. 6-11620. A dispersion compensating optical fiber disclosed in this publication, which has a great negative dispersion, has the same structure as an ordinary optical fiber except for refractive index. When this dispersion compensating optical fiber is only inserted into an optical fiber transmission path in serial, dispersion compensation can be easily performed to chromatic dispersion of the single-mode optical fiber.

Since the dispersion compensating optical fiber is considerably long, in general, the optical fiber is wound into a coil and then packaged to be used. When the optical fiber is incorporated in a transmission apparatus, the optical fiber is preferably packaged with a small size.

However, a long optical fiber is wound, the space occupied by the coil depends on the volume of the optical fiber sectional area×length and the percentage of void. For this reason, when the sectional area, i.e., diameter, of the optical fiber is large, a coil having a large size is obtained. The coil cannot be stored within the transmission apparatus.

As another problem, polarization mode dispersion is posed. When the winding diameter of the optical fiber is decreased, the polarization mode dispersion increases in inverse proportional to the square of the winding diameter.

The dispersion compensating optical fiber has as its object to compensate for the chromatic dispersion of a single-mode optical fiber and to make it possible to perform high-speed communication. However, when polarization mode dispersion increases, even if chromatic dispersion is compensated for, the waveform of a transmission signal is disturbed by polarization mode dispersion. As a result, a reduction in size of a dispersion compensating optical fiber is obstructed.

BRIEF SUMMARY OF THE INVENTION

It is an object of the present invention to provide a dispersion compensating optical fiber which can be wound into a compact small-diameter coil occupying a small space, and which can suppress an increase in polarization mode dispersion.

According to the present invention, there is provided a dispersion compensating optical fiber which is connected to an optical fiber having chromatic dispersion at a transmission wavelength so as to cancel the chromatic dispersion out, thereby making the chromatic dispersion of an entire transmission system at the transmission wavelength substantially zero or making the chromatic dispersion close to zero, and which comprises a core consisting essentially of a quartz-based glass and a cladding formed on the surface of the core and consisting essentially of a quartz-based glass, and a coating layer formed on the surface of the cladding and consisting essentially of a resin, the dispersion compensating optical fiber having an outer diameter of less than 250 $\mu$m, wherein the coating layer has a thickness of not less than 20 $\mu$m and a multi-layer structure consisting of at least two layers including an inner layer and an outer layer having a Young's modulus higher than that of the inner layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
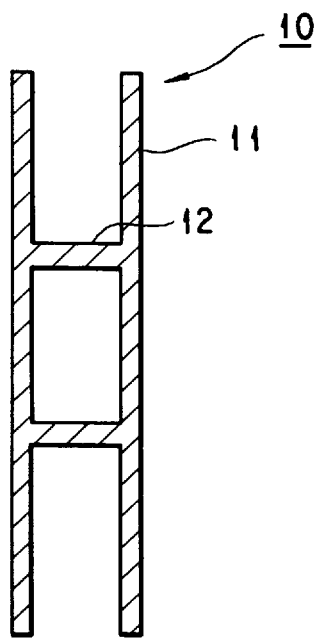
FIG. 1 is a front view showing a reel for winding a dispersion compensating optical fiber according to an embodiment of the present invention.

A dispersion compensating optical fiber comprises a core consisting of a quartz-base glass, a cladding formed on the surface of the core and consisting of a quartz-base glass, and a coating film formed on the surface of the cladding and consisting of a resin, and has an outer diameter of 250 $\mu$m or less.

The coating layer has a multi-layer structure consisting of at least two layers including an outer layer having a Young's modulus higher than that of an inner diameter and has a thickness of 20 $\mu$m or more. If the thickness is smaller than 20 $\mu$m, the strength of an optical fiber is considerably degraded. Although the upper limit of the thickness of the coating layer is not limited to a specific value, if the thickness is excessive, the coil may not be easily reduced in size. Therefore, the thickness of a preferable coating layer is preferably set to 20 to 125 μm.

The coating layer has the multi-layer structure consisting of at least two layers including the inner layer and the outer diameter having a Young's modulus higher than that of the inner layer. When the Young's modulus of the outer layer is not higher than that of the inner diameter, a so-called shell effect cannot be obtained, and external force cannot be prevented from being transmitted to the glass layer. The Young's modulus of the inner layer is preferably set to 0.01 to 0.2 kgf/mm², and the Young's modulus of the outer layer is preferably set to 40 to 200 kgf/mm².

When the coating layer has a two-layer structure, the thickness of the inner layer is preferably set to 14 to 40 μm, and the thickness of the outer layer is preferably set to 6 to 25 μm.

In the coating layer, an ultraviolet curing type resin such as acrylic resin or the like can be used as a resin constituting the inner layer, and an ultraviolet curing type resin such as acrylic resin or the like can be used as a resin constituting the outer layer.

The outer diameter of the cladding is preferably set to 80 to 125 μm. When the outer diameter of the cladding is smaller than 80 μm, loss tends to increase. When the diameter exceeds 125 μm, a decrease in diameter of the coil tends to become difficult.

The optical fiber whose dispersion compensation is performed by the dispersion compensating optical fiber according to the present invention can be a single-mode optical fiber which generally has chromatic dispersion characteristics at a transmission wavelength, e.g., a wavelength of 1.55 μm, and exhibits zero dispersion at a wavelength of 1.3 μm. In contrast to this, the dispersion compensating optical fiber has negative dispersion having a reverse sign to the chromatic dispersion of a transmission path, e.g., at a wavelength of 1.55 μm. The dispersion compensating optical fiber is incorporated in a transmission path, so that the dispersion is canceled out.

The optical fiber having negative dispersion can be obtained by making the difference between the refractive indexes of the core and the cladding considerably larger than that of an ordinary single-mode optical fiber. In order to increase the difference between the refractive indexes of the core and the cladding, germanium may be doped in the core formed of quartz glass to increase the refractive index, and fluorine may be doped in the cladding formed of quartz glass to decrease the refractive index. Note that the cladding may have a two-layer structure consisting of an inner cladding and an outer cladding, and the outer cladding may be undoped.

For the following reasons, the dispersion compensating optical fiber according to the present invention arranged as described above can wound into a compact small-diameter coil occupying a small space and can suppress an increase in polarization mode dispersion.

More specifically, a decrease in coil size is achieved by the dispersion compensating optical fiber according to the present invention.

The fiber length of a dispersion compensating optical fiber per package is determined by the dispersion value of an optical fiber whose dispersion is compensated for and the dispersion characteristics of the dispersion compensating optical fiber. The former depends on the dispersion characteristics and repeating interval of a single-mode optical fiber.

The dispersion characteristics of the single-mode optical fiber per 1 km is about 17 ps/nm. When the repeating interval is set to, e.g., 40 km, an amount of dispersion to be compensated for becomes 680 ps/nm. In contrast to this, when the dispersion characteristics of the dispersion compensating optical fiber is about −90 ps/nm/km, a required length of the dispersion compensating optical fiber becomes 7.5 km.

When the dispersion compensating optical fiber is wound up into a coil, the thickness and outermost diameter of the coil depend on the volume and percentage of void of the optical fiber. Here, when the percentage of void of an optical fiber having an outer diameter of 120 μm to 250 μm was actually measured, the percentage of void was constant to be 0.6. For this reason, the main reason for reducing the coil size is the volume of the optical fiber.

The coil size of a dispersion compensating optical fiber depends on the outer diameter of the fiber when the fiber length is constant. Therefore, in order to achieve a reduction in coil size of the dispersion compensating optical fiber, the thickness of the coating layer and/or the cladding diameter may be reduced.

Objects of coating of an optical fiber is (1) to prevent the glass surface of the optical fiber from being cracked not so as to lower the strength of the optical fiber, (2) to prevent transmission loss from being degraded by distortion caused by stress applied to the optical fiber.

For the former object, a thickness required to prevent foreign particles from being in contact with fiber glass is determined. Even if this thickness is smaller than the thickness of a coating applied to moderate the stress in the latter object, the effect can be obtained. For this reason, the coating thickness determined in the latter object is set as a required thickness.

In the dispersion compensating optical fiber according to the present invention, for the latter object, the coating has a multi-layer structure, e.g., a two-layer structure, the Young's moduluses of the resin constituting the inner layer is set to be low, and the Young's moduluses of the resin constituting the outer layer is set to be high, so that external force is prevented by a so-called shell effect from being transmitted to the glass layer. In this case, where the Young's moduluses and sizes of the respective layers are properly selected within the range ruled as described above, a preferable protection effect can be obtained.

A coating layer in a conventional dispersion compensating optical fiber generally consists of an acrylic resin which is set by ultraviolet rays. The outer diameter of the coating layer is 250 μm. However, this value is set on the assumption that optical fibers are used as cables in various fields.

On the other hand, the dispersion compensating optical fiber according to the present invention is processed into a coil to be used in an accesary device, stress applied to the dispersion compensating optical fiber is considerably lower than stress applied to the conventional dispersion compensating optical fiber used as a cable. Therefore, the coating thickness can be made smaller than that of a conventional dispersion compensating optical fiber. Viewing from the overall volume of the coil, if the glass portion of the fiber can be reduced in volume, the coil can be further reduced in size. For this reason, a reduction in volume of the glass portion of an optical fiber will be described below.

The mode field diameter of a dispersion compensating optical fiber is about 5 μm at a wavelength band of 1.55 μm. In general, influence of reduction in cladding diameter on transmission power can be neglected if the cladding diameter is about 10 or more times the mode field diameter of the dispersion compensating optical fiber. When such a cladding diameter is set, the characteristics of the dispersion compensating optical fiber are the same as those of an optical fiber having a cladding diameter larger than the above cladding diameter.

When the cladding is decreased in diameter, in addition to a decrease in thickness of the coating layer, the volume of the optical fiber can be further reduced. A compact package is achieved.

In order to reduce the optical fiber in volume, it is also effective to reduce the optical fiber in length. For this purpose, a refractive index structure for increasing an amount of dispersion of the dispersion compensating optical fiber in unit length may be designed. In this case, when the optical fiber is reduced in diameter, similarly, a compact package is achieved.

In the dispersion compensating optical fiber according to the present invention, an increase in polarization mode dispersion can be suppressed for the following reasons.

Polarization mode dispersion (PMD) obtained when the dispersion compensating optical fiber is processed into a coil is expressed by the following equation according to R. Ulrichi, et al. (Opt. Lett., Vol. 5, pp 273–275, 1985).

where

C: speed of light in vacuum n: refractive index of quartz (=1.444)

$P_{ij}$: distortion optical coefficient ($P_{11}-P_{12}=0.15$)

v: Poisson's ratio a: cladding diameter

R: winding diameter

It is apparent from the above equation that polarization mode dispersion of a dispersion compensating optical fiber wound into a coil increases in proportional to the square of a cladding diameter. For this reason, when the cladding diameter of the optical fiber is decreased, an increase in polarization mode dispersion when the dispersion compensating optical fiber is wound into a small-diameter coil can be prevented.

Embodiments of the present invention will be described below with reference to the accompanying drawings.

FIG. 1 shows a reel for coil winding used for a dispersion compensating optical fiber according to an embodiment of the present invention. In the reel 10, the outer diameter of a flange 11 is 200 mm, the outer diameter of a drum 12 is 60 nm, and the inner width of the flange 11 is 25 mm. 7.5 km length of various dispersion compensating optical fibers (to be described later) were wound on reel 10, and the outer diameters of the wound coils were measured, so that the coils are compared with each other in size.

EMBODIMENT 1

Figure 2:
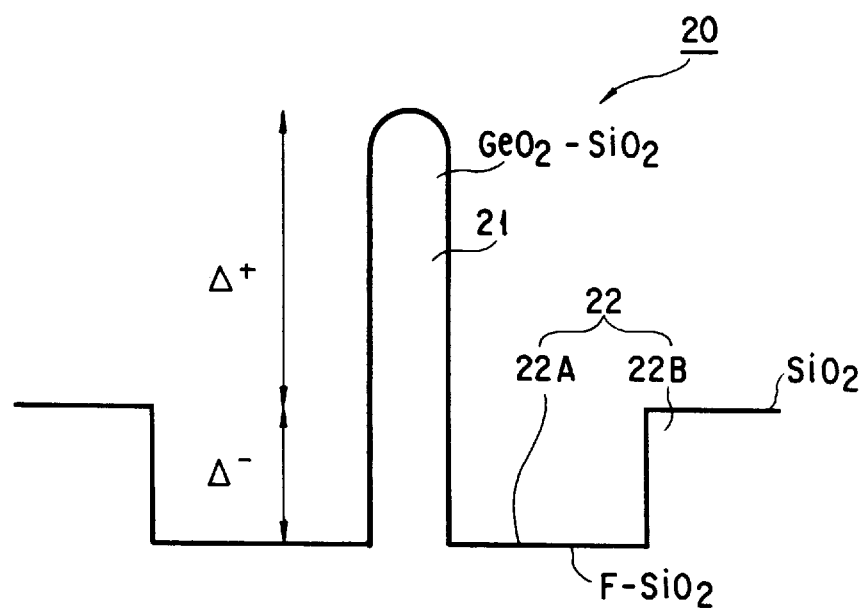
FIG. 2 is a view showing a refractive index profile of the dispersion compensating optical fiber according to the embodiment of the present invention.

FIG. 2 shows refractive index profiles of various dispersion compensating optical fibers 20 wound on the reels 10 into coils. Of the specific refractive index differences of a core 21, $\Delta^+$ (with respect to the reflective index of undoped $SiO_2$) was set to 2.3%, the outer diameter of the core 21 was set to 2.5 μm, the specific refractive index difference $\Delta^-$ (with respect to the refractive index of an undoped $SiO_2$) of an inner cladding 22A of a cladding 22 was set to −0.45%, the outer diameter of the inner cladding 22A was set to 6.3 μm, and the outer diameter of an outer cladding 22B was set to 125 μm.

Figure 3:
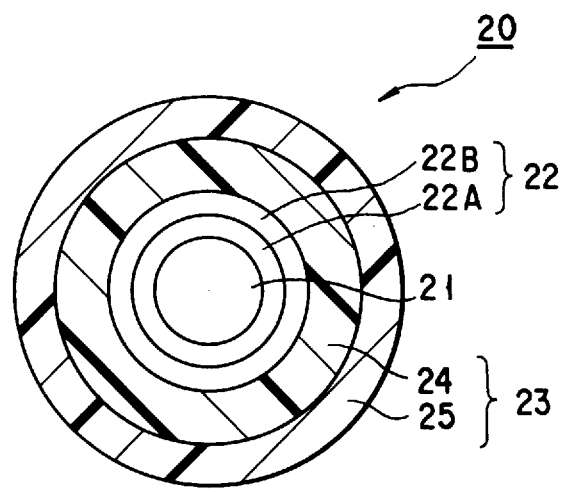
FIG. 3 is a sectional view showing the dispersion compensating optical fiber according to the embodiment of the present invention.

FIG. 3 is a sectional view showing the coating structure of the dispersion compensating optical fiber 20. Referring to FIG. 3, a coating layer 23 consisting of a resin is formed on the surface of the outer cladding 22B, and the coating layer 23 has a two-layer structure consisting of an inner layer 24 and an outer layer 25. The Young's modulus of the resin of the inner layer 24 is 0.2 kgf/mm², and the Young's modulus of the resin of the outer layer 25 is 60 kg/mm², so that a structure in which external force is prevented from being transmitted to a glass layer by a so-called shell effect is constituted.

When the diameter of the coated structure was changed to 250 μm, 180 μm, 165 μm, and 160 μm to fabricate four types of dispersion compensating optical fibers 20. The dispersion compensating optical fibers 20 were wound on the reels 10 shown in FIG. 1 with a tensile force of 7.5 km to each have a length of 7.5 km, thereby obtaining coils.

The measurement results such as the winding outer diameters and the transmission characteristics of the obtained coils are shown in Table 1 described below.

TABLE 1

| OUTER DIA-<br>METER OF<br>COATED DCF<br>(μm) | CLADDING<br>DIAMETER<br>(μm) | COATING<br>THICKNESS<br>(μm) | OUTER<br>DIAMETER<br>OF COIL<br>(mm) | LOSS at<br>1550 nm<br>(dB) | DISPERSION<br>VALUE<br>at 1550 nm<br>(ps/nm) | PMD<br>(PS) | STRENGTH<br>(GPa) |
|---|---|---|---|---|---|---|---|
| 160 | 125 | 17.5 | 125 | 0.6 | −104 | 0.45 | 2.5 |
| 165 | 125 | 20.0 | 130 | 0.5 | −106 | 0.44 | 5.8 |
| 180 | 125 | 27.5 | 140 | 0.7 | −105 | 0.45 | 5.9 |
| 250 | 125 | 62.5 | 190 | 0.5 | −105 | 0.44 | 6.0 |

As is apparent from the measurement results shown in Table 1 described above, percentages of void are 0.6 in any case, and the coil decreases in size as the coating thickness decreases. In addition, even if the coating thickness is reduced, the loss characteristics and the dispersion characteristics do not largely change. This shows that the characteristics of the dispersion compensating optical fiber having the above structure are sufficiently protected even if the coating is reduced, and that the effect of a reduction in size caused by reducing the diameter can be extracted.

However, as is apparent from the results of a tensile test, the strength of the optical fiber sharply decreased when the coating thickness of less than 20 μm. This is because the thickness of the coating is so small that a foreign particles breaks through the coating to reach the glass portion. This shows that the thickness of the coating of the coating layer 23 is limited.

EMBODIMENT 2

Four types of dispersion compensating optical fibers 20 having the following structures were fabricated. That is, the structure of cores 21 and inner claddings 22A of the dispersion compensating optical fibers 20 were the same as those in Embodiment, the outer diameters of outer claddings 22B were set to 90 µm, and the thicknesses of the coatings of coating layers 23 each having the same coating structure as that in Embodiment 1 were changed from 62.5 to 17.5 µmø. The dispersion compensating optical fibers 20 were wound on reels 10 shown in FIG. 1 with a winding tensile force of 25 g to each have a length of 7.5 km, thereby obtaining coils.

The measurement results such as the winding outer diameters and the transmission characteristics of the obtained coils are shown in Table 2 described below.

As shown in Table 3, it was found that, when the outer diameter of the outer cladding 22B decreased, a loss value was degraded. More specifically, coils were not different from each other in characteristic when the outer diameter of the outer cladding 22B was set to 80 µmø. However, it was understood that, even if an optical fiber having the outer cladding 22B having an outer diameter of 60 µm or 70 µm had the reel 10 having a drum diameter of 160 mm, the loss of the optical fiber was larger than that of a dispersion compensating optical fiber having the outer cladding 22B

TABLE 2

| OUTER DIAMETER OF COATED DCF (µm) | CLADDING DIAMETER (µm) | COATING THICKNESS (µm) | OUTER DIAMETER OF COIL (mm) | LOSS at 1550 nm (dB) | DISPERSION VALUE at 1550 nm (ps/nm) | PMD (PS) | STRENGTH (GPa) |
|---|---|---|---|---|---|---|---|
| 125 | 90 | 17.5 | 105 | 0.7 | −104 | 0.25 | 2.3 |
| 130 | 90 | 20.0 | 110 | 0.6 | −106 | 0.23 | 5.6 |
| 145 | 90 | 27.5 | 120 | 0.7 | −105 | 0.22 | 5.3 |
| 215 | 90 | 62.5 | 160 | 0.6 | −104 | 0.22 | 5.9 |

As shown in Table 2, the transmission characteristics and the strengths in Embodiment 2 were the same as those in Embodiment 1. As is apparent from these results, the coating thickness of the coating layer 23 having a two-layer structure is limited to 20 µm in consideration of the strength.

EMBODIMENT 3

As is apparent from Embodiment 1 and Embodiment 2, when the outer diameter of the outer cladding 22B was set to 90 µm, even if the coating thickness of the coating layer 23 was not changed, the winding diameter of the coil could be reduced compared with a case of 125 µmø.

Therefore, according to this embodiment, nine types of dispersion compensating optical fibers 20 having the following structures were fabricated. That is, the coating thicknesses of the coating layers 23 of the dispersion compensating optical fibers 20 each having the same structure as that in Embodiment 1 were set to 25 µm, the outer diameters of outer claddings 22B were set to 60 µm, 70 µm, and 80 µm, the drum diameters of reels 10 were set to 60 mm, 100 mm, and 160 mm. The dispersion compensating optical fiber 20 were wound on reels 10 shown in FIG. 1 with a tensile force of 25 g to each have a length of 7.5 km, thereby obtaining coils.

The measurement results such as the transmission characteristics of the obtained coils obtained as described above are shown in Table 3 described below.

having an outer diameter of 80 µm. In addition, the following was also understood. That is, when the outer cladding 22B was 60 µm or 70 µm, and the drum diameter of the reel 10 was reduced, loss sensitively increased.

It is estimated that the above phenomenon should be caused the following reason. That is, when the glass portion becomes small in thickness, the rigidity of the glass portion itself was degraded, and the core is easily distorted.

According to the above results, it was found that the outer diameter of the outer cladding 22B was desirably set to 80 µmø or more.

EMBODIMENT 4

Six types of dispersion compensating optical fibers 20 having the following structures were fabricated. That is, the diameters of coated structure of the dispersion compensating optical fibers 20 each having the same structure as that in Embodiment 1 were set to 250 µm, the outer diameters of outer claddings 22B were changed to 80 µm, 90 µm, 100 µm, 110 µm, 115 µm, and 125 µm. The dispersion compensating optical fibers 20 were wound on reels 10 shown in FIG. 1 with a winding tensile force of 25 g to each have a length of 7.5 km, thereby obtaining coils.

TABLE 3

| OUTER DIAMETER OF COATED DCF (µm) | CLADDING DIAMETER (µm) | COIL DRUM DIAMETER (mm) | COATING THICKNESS (µm) | LOSS 1550 nm (dB) | DISPERSION VALUE 1550 nm (ps/nm) | PMD (PS) |
|---|---|---|---|---|---|---|
| 110 | 60 | 60 | 25 | 1.0 | −106 | 0.16 |
| 110 | 60 | 100 | 25 | 0.8 | −106 | 0.16 |
| 110 | 60 | 160 | 25 | 0.6 | −106 | 0.16 |
| 120 | 70 | 60 | 25 | 0.9 | −105 | 0.16 |
| 120 | 70 | 100 | 25 | 0.7 | −105 | 0.16 |
| 120 | 70 | 160 | 25 | 0.6 | −105 | 0.16 |
| 130 | 80 | 60 | 25 | 0.4 | −106 | 0.16 |
| 130 | 80 | 100 | 25 | 0.4 | −106 | 0.16 |
| 130 | 80 | 160 | 25 | 0.4 | −106 | 0.16 |

The measurement results such as the transmission characteristics of the dispersion compensating optical fibers obtained as described above are shown in Table 4.

TABLE 4

| OUTER DIAMETER OF COATED DCF (μm) | CLADDING DIAMETER (μm) | COATING THICKNESS (μm) | LOSS at 1550 nm (dB) | DISPERSION VALUE at 1550 nm (ps/nm) | PMD (PS) |
|---|---|---|---|---|---|
| 250 | 80 | 85 | 0.4 | −106 | 0.16 |
| 250 | 90 | 80 | 0.5 | −107 | 0.22 |
| 250 | 100 | 75 | 0.5 | −104 | 0.27 |
| 250 | 110 | 70 | 0.4 | −106 | 0.29 |
| 250 | 115 | 67.5 | 0.4 | −105 | 0.38 |
| 250 | 125 | 67.5 | 0.5 | −105 | 0.44 |

As is apparent from Table 4, the polarization mode dispersion is reduced as the outer diameter of the outer cladding becomes small. In particular, when the outer diameter of the outer cladding is 115 μm, polarization mode dispersion which is substantially the same as that obtained when the outer diameter is 125 μm can be obtained. For this reason, it is understood that the effect of a reduction in polarization mode dispersion cannot be sufficiently obtained when the outer diameter is about 115 μm.

Although the reason for the above phenomenon is not apparent, when bending distortion is insufficiently canceled out due to a reduction in thickness of the cladding layer, influence on polarization mode dispersion characteristics is small.

Therefore, the outer diameter of the cladding is desirably set to 110 μm or less from a point of view on a reduction in polarization mode dispersion.

EMBODIMENT 5

Figure 4:
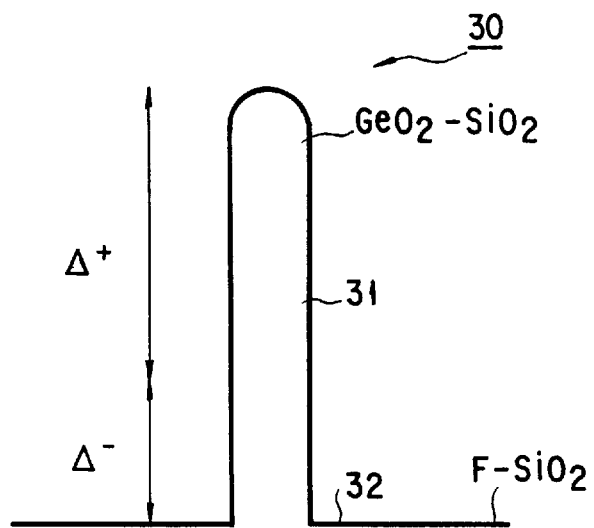
FIG. 4 is a view showing a refractive index profile of a dispersion compensating optical fiber according to another embodiment of the present invention.

FIG. 4 is a view showing a refractive index profile of a dispersion compensating optical fiber 30. Germanium was added to a core 31 to set a specific refractive index different to +2.3% with respect to quartz, and fluorine is added to a cladding 32 to set a specific refractive index difference to −0.45% with respect to quartz.

Sixteen types of dispersion compensating optical fibers 30 having the following structures were fabricated. That is, the outer diameters of the cores 31 were set to 2.5 μm, the outer diameters of the claddings 32 were changed to 80 μm, 90 μm, 110 μm, and 125 μm, the coating thicknesses of coating layers 23 each having the same coating structure as that in Embodiment 1 were changed from 62.5 to 17.5 μm. These optical fibers 30 were wound on reels 10 shown in FIG. 1 with a winding tensile force of 25 g to each have a length of 7.5 km, thereby obtaining coils.

The measurement results such as the transmission characteristics of the obtained coils are shown in Table 5 described below.

TABLE 5

| OUTER DIAMETER OF COATED DCF (μm) | CLADDING DIAMETER (μm) | COATING THICKNESS (μm) | LOSS at 1500 nm (dB) | DISPERSION VALUE at 1550 nm (ps/nm) | PMD (PS) | STRENGTH (GPa) |
|---|---|---|---|---|---|---|
| 115 | 80 | 17.5 | 0.9 | −85 | 0.18 | 2.6 |
| 120 | 80 | 20.0 | 0.6 | −88 | 0.18 | 5.3 |
| 135 | 80 | 27.5 | 0.7 | −86 | 0.17 | 5.5 |
| 205 | 80 | 62.5 | 0.6 | −87 | 0.18 | 5.8 |
| 125 | 90 | 17.5 | 0.7 | −84 | 0.25 | 2.3 |
| 130 | 90 | 20.0 | 0.6 | −86 | 0.23 | 5.6 |
| 145 | 90 | 27.5 | 0.7 | −85 | 0.22 | 5.3 |
| 215 | 90 | 62.5 | 0.6 | −84 | 0.22 | 5.9 |
| 145 | 110 | 17.5 | 0.7 | −89 | 0.35 | 2.6 |
| 150 | 110 | 20.0 | 0.7 | −89 | 0.36 | 5.5 |
| 165 | 110 | 27.5 | 0.6 | −88 | 0.34 | 5.8 |
| 235 | 110 | 62.5 | 0.5 | −86 | 0.34 | 5.7 |
| 160 | 125 | 17.5 | 0.6 | −84 | 0.45 | 2.5 |
| 165 | 125 | 20.0 | 0.5 | −86 | 0.44 | 5.8 |
| 180 | 125 | 27.5 | 0.7 | −85 | 0.45 | 5.9 |
| 250 | 125 | 62.5 | 0.5 | −85 | 0.44 | 6.0 |

According to the measurement results shown in Table 5, the followings are understood. That is, in the structure of the dispersion compensating optical fiber 30 of this embodiment, when the outer diameter of the cladding 32 is 80 μm or more, and the coating thickness of the coating layer 23 was 20 μm or more, the dispersion compensating optical fiber can be wound into a compact small-diameter coil without degrading transmission characteristics.

As has been described above in detail, according to the dispersion compensating optical fiber of the present invention, a coating layer has a laminate structure consisting of at least two layers including an inner layer and an outer layer having a Young's modulus higher than that of the inner layer, the thickness of the coating layer can be made smaller than that of the coating layer of a conventional dispersion compensating optical fiber.

When the outer diameter of a cladding is reduced, even if the dispersion compensating optical fiber is wound into a small-diameter coil, polarization mode dispersion can be reduced. At the same time, a dispersion compensating optical fiber which constitutes a compact small-diameter coil occupying a small space can be achieved.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

We claim:

1. A dispersion compensating optical fiber which is connected to an optical fiber having chromatic dispersion at a transmission wavelength to cancel the chromatic dispersion out, thereby making the chromatic dispersion of an entire transmission system at the transmission wavelength substantially zero or making the chromatic dispersion close to zero, and which comprises:

a core consisting essentially of a quartz-based glass;

a cladding formed on the surface of said core and consisting essentially of a quartz-based glass; and a coating layer formed on the surface of said cladding and consisting essentially of a resin, said dispersion compensating optical fiber having an outer diameter of less than 250 $\mu$m, wherein said coating layer has a thickness of not less than 20 $\mu$m and a multi-layer structure consisting of at least two layers including an inner layer and an outer layer having a Young's modulus higher than that of said inner layer.

2. A dispersion compensating optical fiber according to claim 1, wherein the outer diameter of said cladding is 80 to 125 $\mu$m.

3. A dispersion compensating optical fiber according to claim 1, wherein the thickness of said coating layer is 20 to 125 $\mu$m.

4. A dispersion compensating optical fiber according to claim 1, wherein the Young's modulus of said inner layer is 0.01 to 0.2 kgf/mm$^2$, and the Young's modulus of said outer layer is 40 to 200 kgf/mm$^2$.

5. A dispersion compensating optical fiber according to claim 1, wherein said coating layer has a two-layer structure, the thickness of said inner layer is 14 to 40 $\mu$m, and the thickness of said outer layer is 6 to 25 $\mu$m.

6. A dispersion compensating optical fiber according to claim 1, wherein said inner layer consists essentially of ultraviolet curing type resin.

7. A dispersion compensating optical fiber according to claim 1, wherein said outer layer consists essentially of ultraviolet curing type resin.

8. A dispersion compensating optical fiber according to claim 1, wherein an optical fiber having a chromatic dispersion at the transmission wavelength is a single-mode optical fiber having chromatic dispersion which is substantially zero at a wavelength of 1.3 $\mu$m.

9. A dispersion compensating optical fiber according to claim 1, wherein said dispersion compensating optical fiber is wound on a reel into a coil.

* * * * *